United States Patent
Mar et al.

(10) Patent No.: US 10,477,415 B1
(45) Date of Patent: *Nov. 12, 2019

(54) PORTABLE CELLULAR NETWORK SYSTEM

(71) Applicant: Star Solutions International Inc., Richmond (CA)

(72) Inventors: Jack K. Mar, Vancouver (CA); Yichuang Jin, Vancouver (CA)

(73) Assignee: Star Solutions International Inc., Richmond (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,352

(22) Filed: Nov. 11, 2016

Related U.S. Application Data

(63) Continuation of application No. 14/024,630, filed on Sep. 11, 2013, now Pat. No. 9,532,398.

(51) Int. Cl.
| | |
|---|---|
| *H04W 16/24* | (2009.01) |
| *H04W 4/14* | (2009.01) |
| *H04W 52/36* | (2009.01) |
| *H04W 84/12* | (2009.01) |
| *H04W 24/02* | (2009.01) |
| *H04W 8/18* | (2009.01) |

(Continued)

(52) U.S. Cl.
CPC ............. *H04W 24/02* (2013.01); *H04W 4/14* (2013.01); *H04W 8/18* (2013.01); *H04W 16/24* (2013.01); *H04W 52/36* (2013.01); *H04W 76/50* (2018.02); *H04W 84/12* (2013.01); *H04W 84/18* (2013.01)

(58) Field of Classification Search
CPC ......... H04W 24/02; H04W 4/14; H04W 8/18; H04W 16/24; H04W 52/36; H04W 76/007; H04W 84/12; H04W 84/18; H04W 76/50
See application file for complete search history.

(56) References Cited

U.S. PATENT DOCUMENTS

| | | |
|---|---|---|
| 4,152,647 A | 5/1979 | Gladden et al. |
| 6,047,160 A | 4/2000 | Priest et al. |

(Continued)

FOREIGN PATENT DOCUMENTS

| | | |
|---|---|---|
| EP | 0268375 A2 | 5/1988 |
| WO | 2008027690 A3 | 11/2008 |

(Continued)

*Primary Examiner* — Steven S Kelley
(74) *Attorney, Agent, or Firm* — McDonnell Boehnen Hulbert & Berghoff LLP

(57) ABSTRACT

A system for setting up a cellular network is provided. The system includes a base station module and a core network module. The base station module has a transmitter, a receiver, and a processor configured to provide base station functions to handle transmission and reception of radio signals to and from cellular devices within the cellular network via the transmitter and receiver. The core network module has a processor configured to provide core network functions to handle cellular communication services for the cellular devices. The system has a switch connected to supply power to the base station module and the core network module from a power source. Activating the switch causes the base station functions and core network functions to be automatically and systematically started up to enable full functionality of the cellular network system. The system is sufficiently compact so that it can be carried by hand.

17 Claims, 8 Drawing Sheets

(51) Int. Cl.
*H04W 84/18* (2009.01)
*H04W 76/50* (2018.01)

(56) References Cited

U.S. PATENT DOCUMENTS

| | | | |
|---|---|---|---|
| 6,910,074 B1* | 6/2005 | Amin | H04L 12/2856 709/227 |
| 7,058,423 B1 | 6/2006 | Ahmavaara | |
| 7,477,920 B2* | 1/2009 | Scheinert | H04W 24/02 455/423 |
| 7,555,260 B2 | 6/2009 | Melkesetian | |
| 7,636,236 B1 | 12/2009 | Nana | |
| 7,817,589 B2 | 10/2010 | Hoffmann et al. | |
| 7,881,737 B2 | 2/2011 | Klein | |
| 8,068,808 B2 | 11/2011 | Smith | |
| 8,331,898 B2 | 12/2012 | Waters et al. | |
| 2004/0133164 A1 | 7/2004 | Funderburk et al. | |
| 2005/0152305 A1* | 7/2005 | Ji | H04L 45/54 370/328 |
| 2006/0146790 A1* | 7/2006 | Caballero-Mccann | H04L 29/06027 370/352 |
| 2008/0113676 A1 | 5/2008 | Hutton et al. | |
| 2008/0146158 A1 | 6/2008 | Pan et al. | |
| 2008/0194246 A1* | 8/2008 | Klein | H04W 8/082 455/422.1 |
| 2008/0311894 A1* | 12/2008 | Klein | H04L 41/00 455/414.2 |
| 2008/0316706 A1 | 12/2008 | Liu et al. | |
| 2009/0005074 A1* | 1/2009 | Kahn | H04W 24/02 455/456.2 |
| 2009/0005102 A1* | 1/2009 | Das | H04W 52/241 455/522 |
| 2009/0059836 A1 | 3/2009 | Hamilton | |
| 2009/0097462 A1* | 4/2009 | Ganley | H04B 7/18584 370/338 |
| 2009/0170520 A1 | 7/2009 | Jones | |
| 2009/0323568 A1* | 12/2009 | Hoffmann | H04W 84/10 370/310 |
| 2010/0040026 A1 | 2/2010 | Melkesetian | |
| 2010/0079940 A1 | 4/2010 | Mongia et al. | |
| 2010/0190495 A1* | 7/2010 | Keevill | H04L 12/5692 455/434 |
| 2012/0099663 A1 | 4/2012 | Sabol | |
| 2013/0070610 A1 | 3/2013 | Buccholz et al. | |
| 2013/0115947 A1* | 5/2013 | Xie | H04W 8/205 455/435.1 |
| 2014/0029598 A1* | 1/2014 | Tsay | H04L 12/2834 370/338 |

FOREIGN PATENT DOCUMENTS

| | | |
|---|---|---|
| WO | 2009088708 A1 | 7/2009 |
| WO | 2012056194 A1 | 5/2012 |
| WO | 2012061084 A1 | 5/2012 |

* cited by examiner

PORTABLE CELLULAR NETWORK SYSTEM

CROSS-REFERENCE TO RELATED APPLICATION

This application is a continuation of and claims priority to U.S. patent application Ser. No. 14/024,630, filed Sep. 11, 2013, which is hereby incorporated by reference in its entirety.

BACKGROUND

Conventional cellular network systems are generally complex. They typically consist of many separate network components, requiring highly trained technical personnel to configure, install, operate and maintain. The set-up process can be time-consuming and complicated as the personnel will typically need to physically connect several hardware components using cables or wires, and then start up and configure each component separately and ensure that the components are connected and that the system is functional and properly configured. It may take several days or weeks to install and configure a new cellular network.

Generally, cellular network systems are also physically large. FIG. 1 illustrates a conventional cellular network system 20 having a core network 21, radio base station 22 and transmission tower 23. Core network 21 is connected to radio base station 22 via a transmission network 25. Core network components 24 of core network 21 can fill entire floor-to-ceiling cabinets or even large rooms. Radio base stations are also typically very large. The size of such components makes it difficult to transport them to some areas where cellular networks may be needed. Typical cellular network systems include several geographically-distributed stations in order to be able to provide cellular coverage to a particular area.

Due to their large size and complexity, conventional cellular network systems are impractical to set up in situations where communication services are required on short notice and/or situations where the networks are to be operated by personnel with little or no training in cellular network systems. Such situations might arise in emergency response or disaster relief situations or in other situations where temporary communication services are required. For example, workers who are deployed in remote areas without cellular network coverage may want to communicate with one another and/or with other persons outside of their area using a cellular device. The workers may require communication services immediately upon arriving at their destination, but may not have the time or the expertise required to set up a conventional cellular network system. In addition, it may be too impractical to transport all of the cellular network system components to the remote area in which the workers are deployed.

There is a general desire for cellular network systems and apparatus that address at least some of the aforementioned problems.

The foregoing examples of the related art and limitations related thereto are intended to be illustrative and not exclusive. Other limitations of the related art will become apparent to those of skill in the art upon a reading of the specification and a study of the drawings.

SUMMARY

The technology described herein provides essential cellular network functions from a single standalone unit. In example embodiments, components needed to provide a cellular network system are integrated and housed in a single enclosure. The unit may have appliance-like operation and may be operated without the assistance of trained personnel. The unit may be carried as a backpack.

A standalone wireless cellular communications network can be set up by operating a switch in the unit. The switch triggers execution of a set-up routine which automatically enables full functionality of a cellular network system including enabling a plurality of radio base station functions and a plurality of core network functions. The system may provide voice calling, SMS text messaging and mobile data access to cellular devices within the network. In some embodiments, the cellular communications network is automatically set up and configured and becomes fully operational within a few minutes of turning on the switch. The cellular network system may be suitable for use in situations where temporary communication services are required to be set up on short notice.

Certain embodiments provide a cellular network system that may be connected to an external network. For example, the cellular network system may be connected to an external satellite network through a satellite terminal. The satellite terminal may be communicatively coupled to the cellular network system through a WiFi connection or other means. Once connected to the satellite network, the cellular network system facilitates communication with devices outside of the local cellular network.

Particular embodiments provide a standalone cellular network system for setting up a cellular network. The system is sufficiently compact so that it can be carried by hand or as a backpack. The system includes a base station module and a core network module. The base station module has a transmitter, a receiver, and a base station processor configured to provide a plurality of base station functions to handle transmission and reception of radio signals to and from one or more cellular devices within the cellular network via the transmitter and the receiver. The core network module has a core network processor configured to provide a plurality of core network functions to handle cellular communication services for the cellular devices by processing the radio signals and sending instructions to the base station module. In described embodiments, the cellular communication services include voice calling services, SMS text messaging services and/or mobile data services.

The cellular network system has a switch connected to supply power to the base station module and the core network module from a power source. Activating the switch enables full functionality of the cellular network system including enabling the plurality of radio base station functions and enabling the plurality of core network functions. Activating the switch causes base station applications and core network applications to be automatically and systematically started up.

In some embodiments the core network processor is configured to transcode and/or interwork voice, SMS text messages, or data received in a first digital format to a second digital format. The core network processor may be configured to handle a number of different digital cellular communications formats.

The cellular network system has a WiFi transmitter and receiver in some embodiments. The system's core network processor may be configured to establish a WiFi access point for the system.

Particular embodiments provide a control panel user interface for the cellular network system. An operator may input commands using the control panel user interface to instruct the system's core network processor to cause a voice call to be initiated to a selection of one or more cellular devices, cause a text message to be transmitted to a selection of one or more cellular devices, or cause a voice call between two cellular devices to be interrupted. The operator may also use the control panel user interface to manage call volume. The operator may, for example, disable subscribers associated with lower priority settings from making calls when the channel capacity is approaching overload conditions.

Particular embodiments provide a method for setting up a cellular network system to provide a cellular network. The method includes, in response to receiving an activation signal, automatically powering on a base station module and a core network module of the system. The base station module includes a transmitter, a receiver, and a base station processor configured to provide a plurality of base station applications to handle transmission and reception of radio signals to and from one or more cellular devices within the cellular network via the transmitter and the receiver. The core network module includes a core network processor configured to provide a plurality of core network applications to handle cellular communication services for the cellular devices by processing the radio signals and sending instructions to the base station module. The method includes the base station processor starting execution of the base station applications and the core network processor starting execution of the core network applications.

The method proceeds with the core network processor loading a plurality of predetermined core network configuration settings from a memory storage device, and the base station processor loading a plurality of predetermined base station configuration settings from a memory storage device. The core network processor also loads subscriber data from the memory storage device.

The method proceeds with the core network processor causing a signal to be sent to the base station processor to indicate availability of the core network services. In response to receiving the signal the base station processor establishes a connection of the base station module to the core network module.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 7 is a flowchart illustrating the process that occurs according to one embodiment when a switch for the FIG. 2 apparatus is turned on.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

In embodiments described herein, communications network systems are provided. In particular embodiments, the communications network system establishes a complete standalone cellular network which provides voice calling, SMS text messaging and mobile data services to cellular devices in the network. As used herein, a "cellular device" refers to any mobile terminal (such as a cellular phone) that is capable of making and receiving telephone or voice calls over a radio communication link. In addition to voice calling, such cellular devices may typically support other capabilities such as Short Message Service (SMS) text messaging, mobile data (or data communicated over the cellular network), Multimedia Messaging Service (MMS), WiFi communication, and the like.

Particular embodiments provide apparatus for setting up a cellular network. Components of a cellular network system may be housed within a compact enclosure. The apparatus may be carried by hand or worn as a backpack for transport to a location in which cellular communication services are desired. In particular embodiments, the apparatus has dimensions of 43 cm×30 cm×11 cm and weighs less than 15 kg.

In certain embodiments, all of the components required for providing cellular communication services are integrated within the cellular network system. Thus by operating a single control or switch for the system, a cellular network may be set up and configured without any further action required by the system operator. In particular embodiments the communications network becomes fully operational within a few minutes of the operator operating the switch. When cellular communication services are no longer required, the system and all of its components are shut down and the processes properly terminated by operating the switch.

It can be appreciated that due to their compact size and single-switch operation, systems and apparatus described in the non-limiting examples herein can advantageously be used in situations where temporary communication services are required on an immediate basis. Workers who are deployed in remote areas without cellular network coverage, or workers who are deployed to provide emergency response or disaster relief services, may use the systems and apparatus described herein to set up a cellular communications network in order to communicate with one another and/or with other persons outside of their area using a cellular device. It is not necessary to have specialized training to operate the system described in particular embodiments herein.

Figure 1:
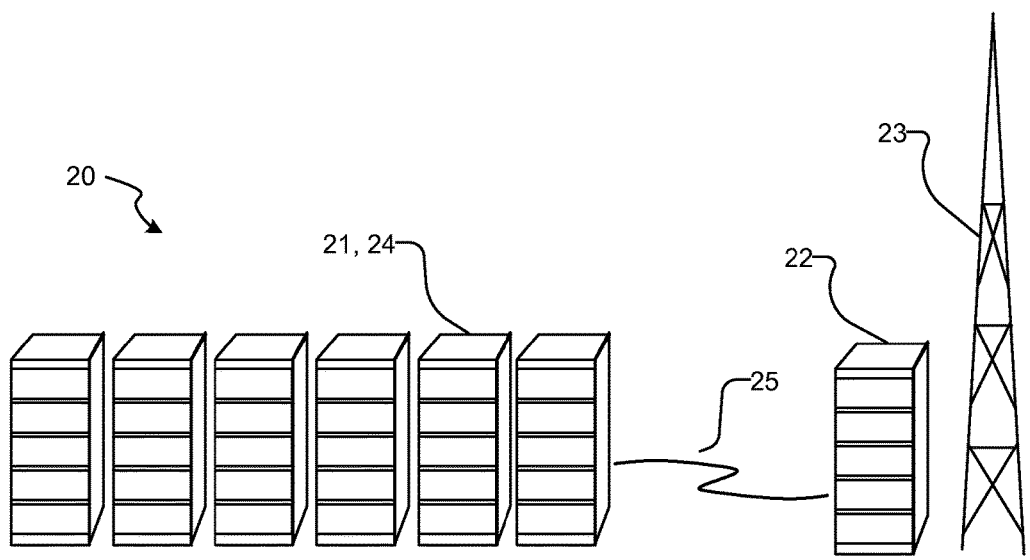
FIG. 1 illustrates the components of a conventional cellular network system.
Figure 2:
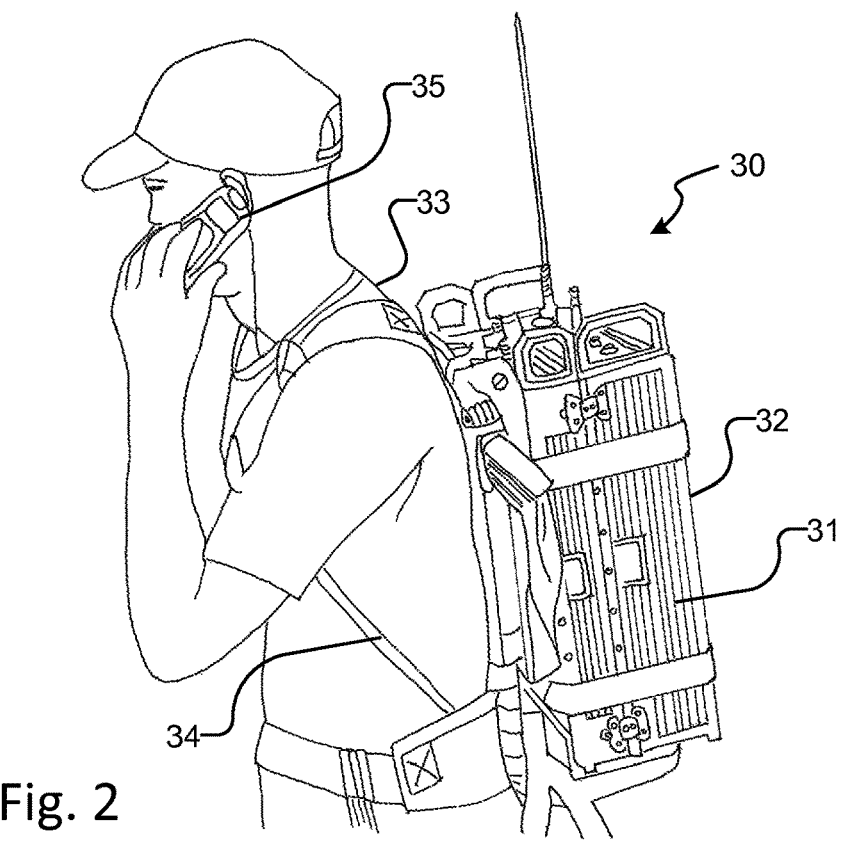
FIG. 2 illustrates a cellular network apparatus according to one embodiment.

FIG. 2 illustrates an apparatus 30 for setting up a standalone cellular network in accordance with one embodiment. Hardware components for establishing a cellular network are housed within a compact and portable enclosure 32 of apparatus 30. As illustrated, apparatus 30 may be carried as a backpack by an operator 33 using shoulder straps 34 attached to enclosure 32. Alternately, apparatus 30 may be carried by hand by grasping one or more handles 36 extending from enclosure 32 (see FIGS. 3A and 3B). Once apparatus 30 is switched on, a cellular network is established, and operator 33 can use cellular device 35 to establish communications with another cellular device in the cellular network. Similarly, other users can communicate with each other on their cellular devices in the cellular network.

Figure 4:
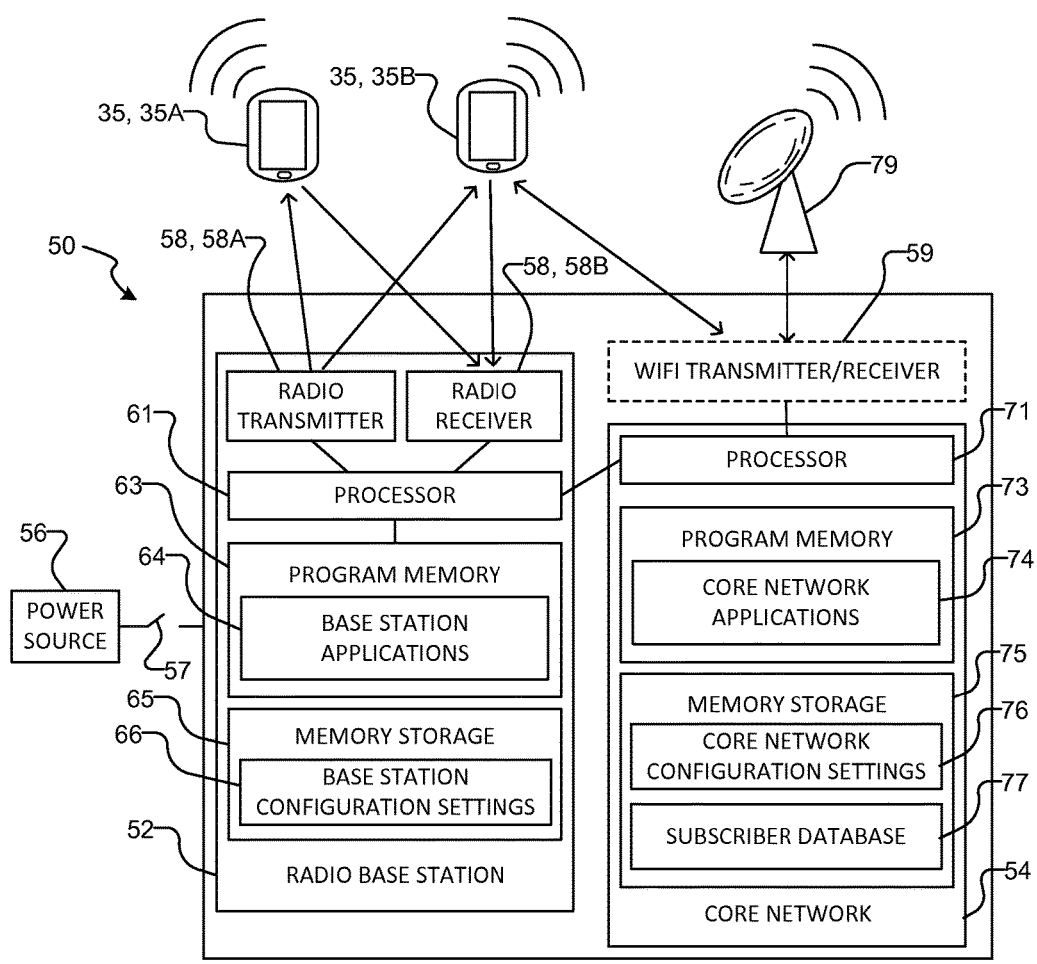
FIG. 4 schematically illustrates the components of a system for setting up a standalone cellular network according to one embodiment.

FIG. 4 illustrates the components of a system 50 for setting up a standalone cellular network in accordance with one embodiment. System 50 includes a radio base station module 52 and a core network module 54, which together carry out a number of functions to facilitate communications between a first cellular device 35A and a second cellular device 35B (collectively, cellular devices 35) in the cellular network.

System 50 also includes a power source 56 that is connected to provide power to hardware components of system 50 including components of base station module 52 and core network module 54. Power source 56 may be a battery pack (e.g. battery pack 49 of FIG. 11). In some embodiments, power source 56 is provided by another external source (e.g. plug-in to a DC or AC supply of power). The supply of power to system 50 may be controlled by the operation of an on/off switch 57.

Base station module 52 functions as a conduit to relay radio signals between cellular devices 35 and core network module 54. As shown in FIG. 4, base station module 52 includes a radio receiver 58B for listening for and receiving radio signals from cellular devices 35. Base station module 52 also includes a radio transmitter 58A for transmitting radio signals to cellular devices 35. Collectively, radio transmitter 58A and radio receiver 58B may be referred to as radio transmitter/receiver 58. In some embodiments the functions of radio transmitter 58A and radio receiver 58B are combined in a radio transceiver.

Base station module 52 also includes a base station processor 61 and a program memory 63 storing a plurality of base station applications 64 (see FIG. 4). Processor 61 receives radio signals from radio receiver 58B and may perform preliminary processing of the radio signals by executing procedures in accordance with base station applications 64. These radio signals are relayed to core network module 54 for further processing and handling. Processor 61 may also carry out various steps under the direction of core network module 54, such as, for example, transmission of radio signals to a cellular device 35 via radio transmitter 58A.

Base station module 52 also includes memory storage 65. A plurality of pre-loaded base station configuration settings 66 may be stored in memory storage 65. Base station configuration settings 66 may be input to the base station start-up functions which are executed by processor 61 upon powering on system 50 in order to configure and set up the base station module 52 of the cellular network.

Core network module 54 processes the signals to and from cellular devices 35 (send and received through base station module 52) and, as will be described in further detail below with reference to FIG. 5, handles most of the functions needed to provide cellular communication services to cellular devices 35. As seen in FIG. 4, core network module 54 includes a core network processor 71 and a program memory 73 storing a plurality of core network applications 74. Processor 71 executes instructions in accordance with core network applications 74 in order to manage and process communications such as voice calls, SMS text messages and/or mobile data. In accordance with core network applications 74, processor 71 sends instructions to base station module 52 directing base station module 52 to transmit radio signals to a cellular device 35.

Core network module 54 also includes memory storage 75. A plurality of pre-loaded core network configuration settings 76 may be stored in memory storage 75. Core network configuration settings 76 may be input to the core network start-up functions which are executed by processor 71 upon powering on system 50 in order to configure and set up the core network module 54 of the cellular network. A subscriber database 77 may also be stored in memory storage 75. Subscriber database 77 may include information needed to authenticate and manage subscribers on the network (e.g. subscriber identification, account information, profile information, call logs, etc.).

As illustrated in FIG. 4, system 50 may include a WiFi transmitter/receiver 59. WiFi transmitter/receiver 59 enables system 50 to establish a WiFi communication link with one or more WiFi-enabled devices. System 50 can be configured to provide a WiFi access point for cellular devices 35 or other WiFi-enabled devices in the local area network. For example, a WiFi-enabled cellular device 35 within range of the access point can establish a WiFi connection with system 50 to communicate with system 50 and other devices in the network.

In some embodiments an external terminal, such as a portable satellite terminal 79 as shown in FIG. 4, may be WiFi-enabled and may be in communication with system 50 via system 50's WiFi transmitter/receiver 59. Satellite terminal 79 can be used to connect system 50 with an external satellite network so that cellular devices 35 in the local network established by system 50 can communicate with other devices outside of the local network.

Various components of system 50 may be housed within the enclosure 32 of FIG. 2's apparatus 30. For example, radio transmitter/receiver 58, processor 61, program memory 63 and memory storage 65 of base station module 52 may be encased in enclosure 32. Similarly, processor 71, program memory 73 and memory storage 75 of core network module 54 may be encased in enclosure 32. WiFi transmitter/receiver 59 may also be housed in enclosure 32. Other components of system 50 may be attached to enclosure 32 and positioned at least partially external to enclosure 32. Such components may include, for example, one or more antenna 42 (shown in FIG. 10) connected to radio transmitter/receiver 58, and an antenna 43 (shown in FIG. 10) connected to WiFi transmitter/receiver 59.

Figures 5, 6:
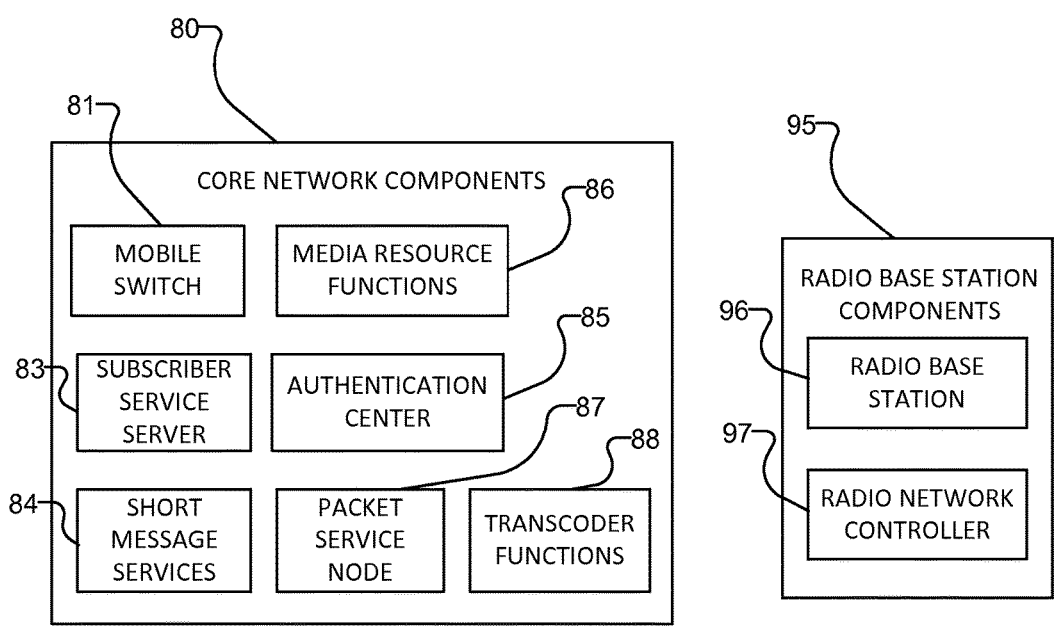
FIG. 5 schematically illustrates the functions of a core network that may be implemented by the system of FIG. 4.
FIG. 6 schematically illustrates the functions of a radio base station that may be implemented by the system of FIG. 4.

FIGS. 5 and 6 depict functions of the core network module 54 and radio base station module 52 that may be implemented by base station applications 64 and core network applications 74 respectively of FIG. 4's system 50. As seen in FIG. 5, the core network module may carry out the following functions:

- a mobile switch 81—handles most of the call management functions, including routing voice calls and establishing and releasing end-to-end connection. For example, in response to receiving a signal from cellular device 35A (via base station module 52) requesting a call to cellular device 35B, mobile switch 81 may relay instructions to base station module 52 to route the call to cellular device 35B.

subscriber service server 83 and authentication center 85—together, these functions manage subscriber authentication, authorization and accounting functions, such as, for example, ensuring that the caller is a registered subscriber on the network and is using a properly authenticated phone and is permitted to make the call. These functions may retrieve data from and write data to subscriber database 77 stored in memory storage 75 (FIG. 4).

short message services 84—responsible for the communication of SMS text messages between cellular devices.

media resource functions 86—responsible for media-related functions including playing tones (e.g. ring tone, busy tone, etc.) and system announcements.

packet service node 87—handles packet switching services such as converting data into packets and managing packet traffic. Packet switching may be used in providing mobile data services to cellular devices in the network.

transcoder functions 88—handles transcoding of signals from one format to another to enable communication between different cellular devices. For example, analog voice signals may be converted to a digital format or vice versa, or signals in one digital format may be converted to signals in another digital format. In particular embodiments, transcoder functions 88 detect the format of the incoming communication signal and determine whether or not conversion to another format is required, and if so, will handle the conversion. Digital formats that are supported by transcoder functions 88 may include media payload formats transported by GSM, CDMA, WCDMA, WiMAX and LTE standards and the like. The transcoder functions 88 advantageously permit system 50 to establish communications between different cellular devices in the cellular network without requiring a connection to servers or other machines to provide the transcoder functions (as would be typically required for conventional cellular networks). This allows system 50 to provide cellular communication services from a compact enclosure and from any location, independently of other machines or external networks.

As seen in FIG. 6, the radio base station module may carry out the following functions:

a radio base station 96—handles the relaying of signals between a cellular device and the core network.

a radio network controller 97—responsible for managing the transmission and reception of signals at the base station. Where there is more than one base station that is available to handle a call in the network, radio network controller 97 may determine which base station is responsible, and controls the handoff of signals between base stations.

Figure 7:
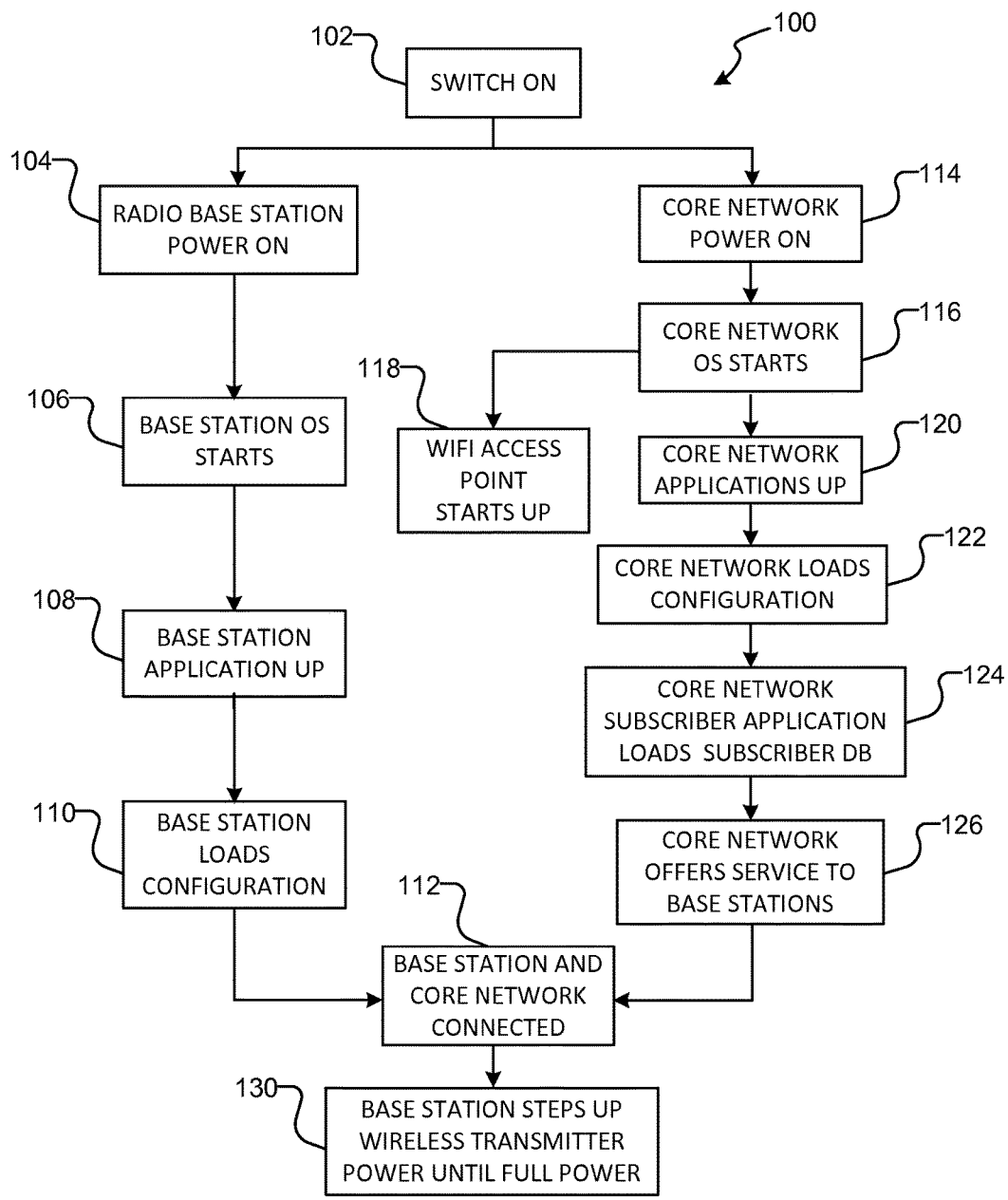

As previously noted, all of the components required for providing cellular communication services are integrated within enclosure 32, such that, by the operator turning on a single switch or operating some other control, a cellular network is set up and configured and becomes fully operational within a few minutes without any further action required by the operator. FIG. 7 shows a start-up process 100 that occurs when system 50 of FIG. 4 is powered on. Process 100 begins with the operation of a switch at block 102. For example, the operator may press a button, move a manual switch (such as on/off switch 47 of FIG. 10), or the like, to cause an electrical switch 57 to be closed, thereby allowing for the supply of power from the power source 56 to components of system 50 (see FIG. 4).

Once the switch has been turned on, process 100 proceeds by powering on and setting up the radio base station module at blocks 104 to 110 and the core network module at blocks 114 to 126. The process executed at blocks 104 to 110 may be generally performed in parallel with the process executed at blocks 114 to 126. Some of the steps may take longer than others; thus the steps carried out at blocks 104 to 110 are not necessarily completed at the same time as those carried out at blocks 114 to 126. In particular embodiments, all of the steps of process 100 are executed and completed within approximately 3 minutes of the switch being turned on at block 102. The process steps which occur once the switch has been turned on are described in more detail below.

The radio base station and core network modules are powered on at blocks 104, 114 respectively. This may involve various hardware components turning on, such as for example, processor 61 and radio transmitter/receiver 58 of base station module 52, and processor 71 of core network module 54, of FIG. 4's system 50. Random-access memory (RAM) and other memory storage devices required by applications of base station module 52 and core network module 54 may also be powered on at this time. The application of power to each hardware component may be controlled by relays or the like. The sequential turning on of each component may be managed or coordinated by control software.

Process 100 next proceeds by starting up the radio base station operating system and the core network operating system at blocks 106, 116 respectively. Starting of these operating systems then allows for base station applications to start executing under the management of the base station operating system at block 108, and the core network applications to start executing under the management of the core network operating system at block 120. Also, at block 118 the core network operating system may direct a WiFi access point for the system to be started up.

At blocks 110 and 126, the radio base station applications and core network applications respectively load their configuration settings. The radio base station configuration settings 66 may be retrieved from memory storage 65 of base station module 52 of FIG. 4's system 50. Similarly, the core network configuration settings 76 may be retrieved from memory storage 75 of core network module 54 of FIG. 4's system 50. These configuration settings are used by the base station and the core network applications to determine various parameters for operation of the base station and core network. Base station configuration settings may include, for example: system identification, operating frequency, transmit power, and modulation scheme. Core network configuration settings may include, for example, system identification, routing tables, class of service, and resource allocation.

Once the core network configuration settings are loaded, the core network subscriber application loads subscriber information at block 124. Such information may be retrieved from a subscriber database 77 stored in memory storage 75 of core network module 54 (see FIG. 4). The subscriber information may be used to execute various core network subscriber functions. These may include the subscriber functions previously described with reference to FIG. 5, such as managing subscriber authentication, authorization and accounting functions.

Process 100 then proceeds to block 126 at which the core network offers its services to the base station. For example the core network may send a signal to the base station advertising the core network's availability. If the base station has finished loading (i.e. the steps at blocks 104 to 110 are complete), it responds to this signal and establishes a connection with the core network at block 112. This connection allows for communication of signals between processor 61 of base station module 52 and processor 71 of core network module 54.

At block 130, the base station may gradually step up its wireless transmitter power (e.g. radio transmitter 58A of FIG. 4's system 50) until it is operating at full power. At this point the cellular network is fully established, and communications (such as voice calls) may be established between cellular devices 35 in the network. Similarly, SMS text messages may be exchanged between cellular devices in the network.

The steps of process 100 pertaining to the start-up of the radio base station may be implemented as software applications 64 contained in a program memory 63 accessible to processor 61 of base station module 52 of FIG. 4's system 50. The steps of process 100 pertaining to the start-up of the core network may be implemented as software applications 74 contained in a program memory 73 accessible to processor 71 of core network module 54 of FIG. 4's system 50. The processors implement the steps by executing software instructions provided by the software applications.

The following is a non-limiting example of how a cellular network system 50, which has been set up to provide a cellular network, may be used by persons to make calls. Suppose that a user wishes to make a call on his cellular device 35A to another cellular device 35B in the network. Cellular device 35A initially scans for a radio signal from a radio base station, and will detect a signal from radio base station module 52. Signals are then exchanged between the cellular device 35A and radio base station module 52, and radio base station module 52 relays signals to and from core network module 54 in order to establish a connection of cellular device 35A to the cellular network. For example, core network module 54 may receive information to identify the cellular device, and various functions are executed at the core network module (e.g. such as the functions carried out by subscriber service server 83 and authentication center 85 of FIG. 5) to ensure that the cellular device is registered as a subscriber of the cellular network. If cellular device 35A is authorized to be on the network, a connection is established and cellular device 35A is permitted to make and receive calls. Similar steps may be performed to establish a cellular network connection with cellular device 35B to enable that device to make and receive calls.

The user may then use cellular device 35A to place a call to cellular device 35B (or vice versa). Cellular device 35A transmits a signal to radio base station module 52 to initiate the call. The signal is handed across the network, through core network module 54 and then back to radio base station module 52, to cellular device 35B. The operator of cellular device 35B receives the signal indicating the incoming call. If he accepts the call on his device, a two-way voice call connection between cellular devices 35A, 35B is established, and voice signals for the call are handed across the network.

System 50 may be configured to support communication between different types of cellular devices, including standard cellular phones. For example, in particular embodiments, system 50 is compatible with cellular phones that support GSM, CDMA, WCDMA, WiMAX and LTE standards. The transcoder functions described above with reference to FIG. 5 may enable system 50 to support communications between different types of cellular devices.

Figure 10:
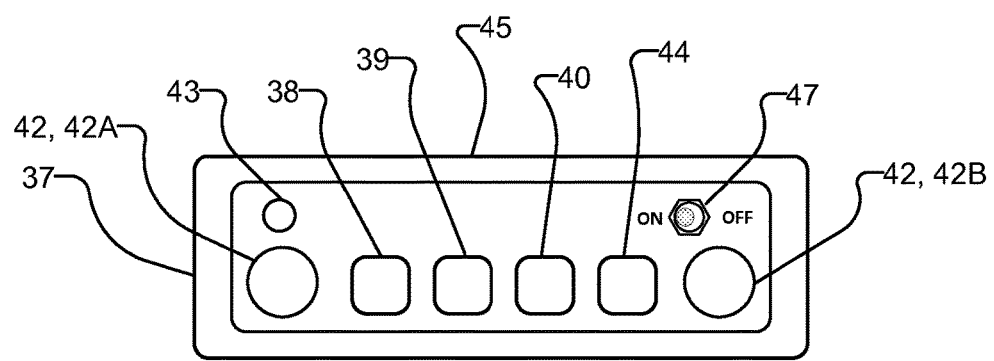
FIG. 10 illustrates a front panel for the apparatus of FIG. 2.

The above example outlines a call between two cellular devices 35A, 35B in a cellular network established by system 50. The range of the cellular network may be up to approximately 3 km for particular embodiments. System 50 can also be configured to facilitate communications to devices outside of the cellular network. This can be achieved by connecting system 50 to external networks such as terrestrial, satellite or wireless broadband networks. The interface between system 50 and the external network may employ the use of WiFi, Ethernet cable, USB, analogue wired connection, or the like. FIG. 10 shows a front panel 37 for a cellular network system 50 in accordance with one embodiment. Panel 37 includes an Ethernet cable socket 38 and a USB socket 39. In addition, panel 37 has a WiFi antenna 43 for the transmission and reception of WiFi signals.

Satellite transmission may be used in some cases to enables calls to be made to devices outside of the cellular network established by system 50. For example, as seen in FIG. 4, a satellite terminal 79 may be provided to establish a connection with an external satellite network. In the illustrated embodiment, the satellite terminal is WiFi-enabled and is communicatively coupled to system 50 by way of a WiFi connection through system 50's WiFi transmitter/receiver 59. In other embodiments, the satellite terminal is connected to system 50 by Ethernet cable or USB connection or other suitable means. A call made from a cellular device 35 to a device that is not within the cellular network may be handed across the cellular network to the satellite network via satellite terminal 79.

In addition to voice calling, connecting system 50 to an external network via one of the methods described above can permit SMS text messages and other types of communications to be made to or received from devices outside of the cellular network established by system 50. The connection of system 50 to an external network can also be used to provide mobile data access to cellular devices in the cellular network. The cellular devices can access a data network (e.g. an external data network, such as the Internet, or a local data network) via a WiFi connection to the WiFi access point provided by system 50, or alternately by way of a cellular network connection provided by system 50.

System 50 may be configured to support SOS or emergency calls made on the cellular network. During a rescue or disaster recovery operation, the cellular devices used by people in distress are not generally registered in the subscriber database managed by system 50. However, when a caller dials an emergency number, such as 911, from a cellular device within the range of the cellular network established by system 50, the system's core network module 54 can bypass the regular authentication procedures and place the call to the rescue team or the first responders.

Figure 8:
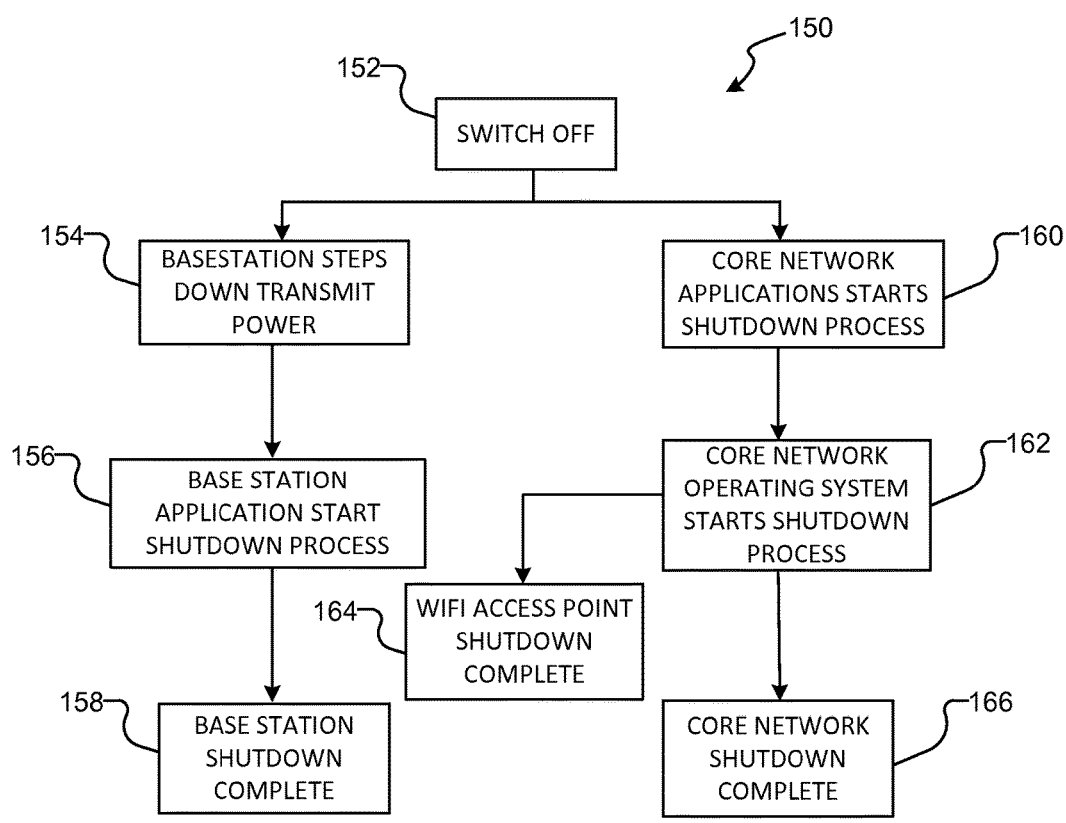
FIG. 8 is a flowchart illustrating the process that occurs according to one embodiment when a switch for the FIG. 2 apparatus is turned off.

When the cellular network is no longer required, system 50 of FIG. 4 may be powered down in accordance with a process 150 as shown in FIG. 8. A complete shutdown of system 50 may be carried out by turning off a switch or operating some other control, without any further action required by the operator. FIG. 8's process 150 begins with the operator turning off a switch at block 152. For example, the operator may press the same button or move the same manual switch that was used to power on the system at block 102 of FIG. 7's start-up process 100. This action initiates the steps required for shutdown, including the steps for shutting down the radio base station at blocks 154 to 158 and the steps for shutting down the core network at blocks 160 to 166. The process executed at blocks 154 to 158 may be generally performed in parallel with the process executed at blocks 160 to 166. Some of the steps may take longer than others; therefore, the steps carried out at blocks 154 to 158 are not necessarily completed at the same time as those carried out at blocks 160 to 166.

Once the switch is turned off by the operator at block 152, process 150 proceeds by gradually stepping down the radio base station's wireless transmitter power at block 154. Core network applications initiate their shut down process at block 160. This is followed by the core network operating system initiating its shutdown process at block 162. The core network operating system may direct the system's WiFi access point to be shut down at block 164. Concurrently with the foregoing steps, the radio base station applications initiate their shut down process at block 156. Shutdown of the radio base station applications and core network applications may involve the applications writing data to memory storage for later use (e.g. subscriber information, call information, etc.). Once all of the applications are terminated, the base station shutdown is complete (block 158) and the core network shutdown is complete (block 166).

The steps of process 150 pertaining to the shutdown of the radio base station may be implemented as software applications 64 contained in a program memory 63 accessible to processor 61 of base station module 52 of FIG. 4's system 50. The steps of process 150 pertaining to the shutdown of the core network may be implemented as software applications 74 contained in a program memory 73 accessible to processor 71 of core network module 54 of FIG. 4's system 50. The processors implement the steps by executing software instructions provided by the software applications.

In particular embodiments, system 50 is configured to provide a control panel user interface for use by an operator to manage calls, SMS text messages and other communications in the cellular network. Such communication management functions may be useful where a personnel team has been deployed in an area and there is a desire for an operator to broadcast communications to and manage communications among the personnel. In one embodiment, core network module 54 of system 50 provides a control panel user interface which is displayable on a computer, cellular device or tablet device that is communicatively connected to system 50 (e.g. via WiFi, USB, Ethernet cable connection, and the like). In other embodiments the control panel user interface is displayable on a display unit or screen connected to or incorporated into system 50. The operator's input to the control panel user interface may be provided via touch screen selection or keyboard and mouse input.

Figure 9A:
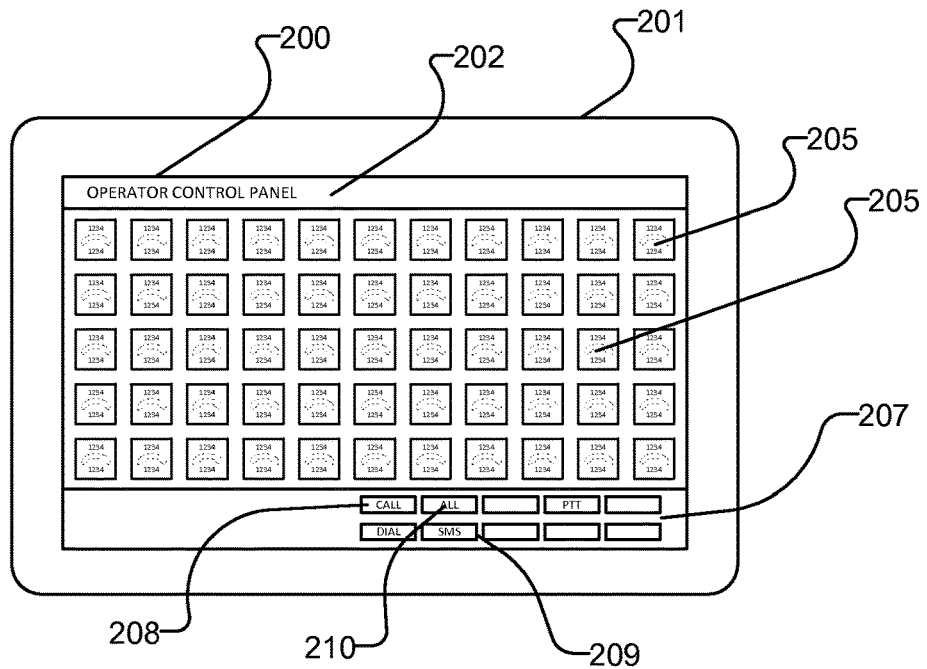
FIGS. 9A and 9B illustrate a control panel user interface that may be used by an operator to manage calls in the cellular network according to one embodiment.
Figure 9B:
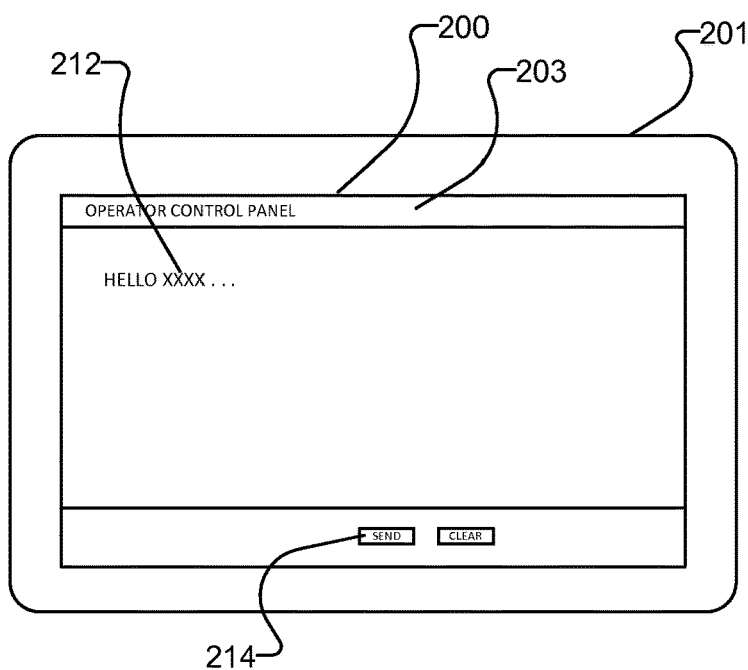

The control panel user interface can be configured to permit a number of communication management functions. The following non-limiting examples of such functions are described with reference to FIGS. 9A and 9B. FIGS. 9A and 9B show main control panel window 202 and text message window 203 respectively of a control panel user interface 200 displayed on a table device 201. The functions enabled by control panel user interface 200 may include, for example, functions to cause a call to be initiated or a text message to be sent to a cellular device. To access such functions, the operator selects one of the buttons 205 displayed on main control panel window 202 (FIG. 9A), representing a particular cellular device on the network. The operator then selects either a CALL button 208 or an SMS button 209 from a functions menu 207. If CALL button 208 is selected, the core network module is directed to initiate a telephone call to the selected cellular device. The operator can participate in the call to the cellular device from the control panel (e.g. via a connected handset) or from a pre-assigned operator cellular device. If SMS button 209 is selected instead of CALL button 208, new text message window 203 (FIG. 9B) is opened for input of a text message. The operator types in a text message 212 and selects button 214 for SEND. This directs the core network module to transmit the text message to the selected cellular device.

Other functions may cause a group call to be initiated or a text message to be sent to two or more cellular devices. To access these functions, the operator can select one of the buttons displayed on the control panel window, representing a particular group of cellular devices on the network. Alternatively, in some embodiments, the operator can select a group of cellular devices by selecting multiple buttons 205 displayed on the main control panel window 202 (FIG. 9A), each button associated with a particular cellular device on the network. The operator then selects either CALL button 208 or SMS button 209 from functions menu 207. If CALL button 208 is selected, the core network module is directed to initiate a group call to the selected group of cellular devices. The operator can participate in the group call from the control panel (e.g. via a connected handset) or from a pre-assigned operator cellular device. If SMS button 209 is selected instead of CALL button 208, new text message window 203 (FIG. 9B) is opened for input of a text message. The operator types in a text message 212 and selects button 214 for SEND. This directs the core network module to transmit the text message to the group of cellular devices. In some embodiments, the control panel permits the operator to select all cellular devices on the network (e.g. by selecting the ALL button 210 from functions menu 207 on main control panel window 202). The operator can then communicate with all cellular devices in the network, by for example, broadcasting a text message to the cellular devices.

Other functions that may be supported by the control panel user interface include:
- The control panel user interface may execute an authentication function requiring authentication of the operator (e.g. by user name and password verification) before access to the control panel is permitted.
- The control panel may display the phone user state for each cellular device on the network. Such states may include one of: IDLE, IN CALL, RINGING, and OFF HOOK.
- The operator can view the calls in progress and, when needed, enter a command using the control panel to interrupt any established calls in progress. For example, the operator can join an established call, or disconnect the call.

System 50 may be configured to warn an operator of overload situations so that the operator can manage the call volume. For example, core network module 54 can track the number of calls in session, and display the number on the control panel user interface (and/or a warning if the channel capacity is near overload conditions) so that the operator can take measures if needed to discontinue service to certain subscribers. The subscriber profiles may assign a priority setting to each subscriber. First responders may be assigned a higher priority setting than other responders. During times of peak call volume, subscribers associated with a higher priority setting may be allowed to make calls, while subscribers associated with a lower priority setting may be disabled from making calls. In some embodiments, the system may be configured to automatically discontinue service to lower priority subscribers when the channel capacity is approaching overload conditions.

Figure 3A:
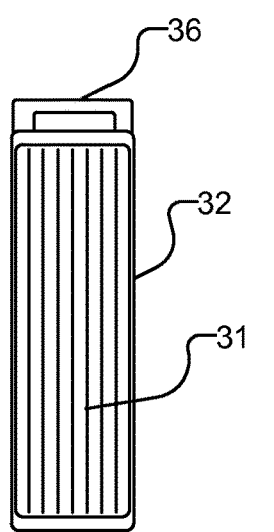
FIGS. 3A and 3B are side and rear views respectively of the apparatus of FIG. 2.
Figure 3B:
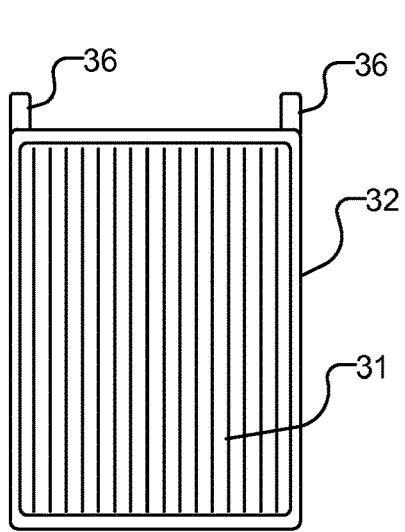

As shown in FIGS. 2, 3A and 3B, apparatus 30 may incorporate an enclosure 32 for housing all of the cellular network system components. Enclosure 32 may be a water-tight enclosure. It may be designed to withstand water submersion of a depth of up to one meter.

In particular embodiments, cellular network apparatus 30 is passively cooled (i.e. without the assistance of energy-consuming devices such as pumps or fans, etc.). For example, a heat sink 45 (FIG. 10) may be incorporated in or connected to the apparatus's enclosure 32 to assist with cooling the system. Heat sink 45 may consist of a plurality of fins 31 extending along one or more sides of enclosure 32, as seen in FIGS. 2, 3A and 3B. A plurality of fins 31 may be arranged generally parallel to one another and extend from a surface of enclosure 32. In particular embodiments, heat sink 45 is adapted and incorporated into enclosure 32 such that the passive cooling enabled by heat sink 45 provides all of the cooling requirements for the system. In some embodiments, cellular network apparatus 30 is designed to withstand outdoor use in a range of environments. As such, apparatus 30 may be designed to be capable of operating in a temperature range of between −40° C. to +50° C.

Figure 11:
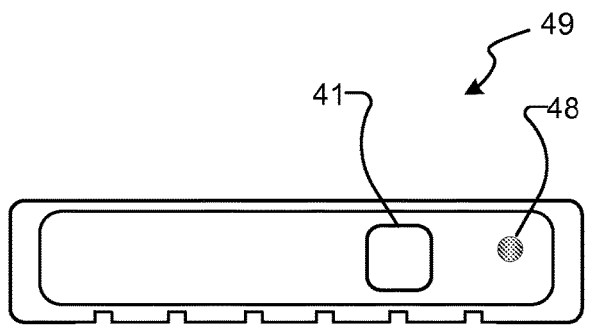
FIG. 11 illustrates a battery pack that may be used with the apparatus of FIG. 2.

FIG. 11 shows a battery pack 49 which may be provided for use in conjunction with apparatus 30 to supply power to cellular network system 50. Battery pack 49 includes a connector 41 for connecting either to a power input to system 50 or to a battery charger. In the illustrated embodiment, battery pack 49 also includes a battery status indicator 48 which flashes, lights up, turns a particular colour or provides some other indication when the battery pack 49 power has dropped below a threshold value.

In preferred embodiments cellular network system 50 has at least two power inputs. This allows a second power source (e.g. a second battery or an AC or DC power source) to be plugged into the system, so that the system can operate without interruption when the primary power source is disconnected (e.g. the battery pack may be removed for charging, or replaced with a new battery pack). FIG. 10 illustrates a front panel for an apparatus 30 including a socket 40 for plugging in a DC power source and a socket 44 for plugging in a battery pack.

Cellular network system 50 incorporates one or more antennas which function with transmitter/receiver 58 to receive and transmit radio signals. In the illustrated embodiment of FIG. 10, first and second antennas 42A, 42B (collectively, antennas 42) are provided to receive and transmit signals. The use of more than one antenna for multiple-input and multiple-output (MIMO) may lend to improved communication performance for certain standards of radio communications.

In some embodiments, a cable may be connected to one or more antenna ports so that an external antenna may be used. The external antenna may be mounted in a higher location to provide better cellular coverage.

Where a component (e.g. radio base station, core network, cellular device, receiver, transmitter, server, network, database, module, processor, program memory, power source, switch, antenna, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments of the invention.

While a number of exemplary aspects and embodiments have been discussed above, those of skill in the art will recognize certain modifications, permutations, additions and sub-combinations thereof. For example:

The illustrated embodiment of FIG. 4 shows a separate processor, program memory and memory storage for configuration settings and/or subscriber data, for each of radio base station module 52 and core network module 54. It is not necessary to provide separate components for each module. In some embodiments, for example, radio base station module 52 and core network module 54 may share the same processor, program memory and/or memory storage. Also, in some embodiments, the program memory and memory storage may be provided in one storage component.

In the particular embodiments described above, the base station and core network applications are implemented in software running on the base station module or the core network module. In other embodiments, one or more of the base station and core network applications may be implemented in hardware incorporated in or accessible to the modules, or in a mix of software and hardware.

In particular embodiments, cellular network apparatus 30 is configured to support up to 1,000 subscribers and up to 30 simultaneous calls. In some embodiments, more than one cellular network apparatus 30 may be deployed in a particular area to establish a larger cellular network and support additional calls. Each base station module 52 and core network module 54 in a cellular network apparatus 30 may be configured to operate within the larger network.

System 50 may be configured to provide call services for IP phones or VoIP phones in a local area network established by system 50. The signalling protocol typically used for such phones is SIP (session initiated protocol). System 50 may connect with an IP phone within the network via an Ethernet cable or WiFi connection, for example, to enable the IP phone to place calls to other devices in the network.

It is therefore intended that the scope of the following appended claims and claims hereafter introduced should not be limited by the embodiments set forth in the examples, but should be given the broadest interpretation consistent with the description as a whole.

What is claimed is:

1. A method comprising:
receiving, at a portable wireless communication system that includes a radio base station and a core network module housed in a single enclosure, electrical power caused by activation of a single switch;
initializing components of the radio base station and the core network module, wherein initializing components of the radio base station involves loading, by a base station application program, base station configuration settings from base station memory, and wherein initializing components of the core network module involves loading, by a subscriber application program, subscriber information from a subscriber database into core network memory;
offering, by the core network module to the radio base station, core network services that facilitate placement and reception of calls by wireless communication devices served by the portable wireless communication system, wherein the portable wireless communication system is operating as a standalone cellular network;

accepting, by the radio base station, the offered core network services and establishing a connection between the radio base station and the core network module;

in response to establishing the connection between the radio base station and the core network module, stepping up, by the radio base station, transmit power of a transceiver until the transceiver is transmitting at full power, wherein the core network module includes a control panel user interface for initiating calls and entering SMS text messages, the control panel user interface including a first button and a second button and the control panel user interface is configured to: (i) cause a call between at least two of the wireless communication devices served by the portable wireless communication system to be initiated by actuation of the first button, and (ii) cause an entered SMS text message to be sent to at least one of the wireless communication devices served by the portable wireless communication system by actuation of the second button; and in response to deactivation caused by the single switch, deactivating components of the radio base station and the core network module, wherein deactivating components of the radio base station involves storing, by the base station application program, current base station configuration settings to base station memory, and stepping down, by the radio base station, transmit power of the transceiver until the transceiver is off, and wherein deactivating components of the core network module involves storing, by the subscriber application program, current subscriber information and call information into the core network memory.

2. The method of claim 1, wherein initializing components of the radio base station and the core network module occurs in a partially parallel fashion.

3. The method of claim 1, wherein the wireless communication devices are cellular devices, and wherein the calls are cellular calls.

4. The method of claim 1, wherein the radio base station includes the transceiver and a base station processor, wherein the base station memory stores the base station application program and the base station configuration settings, wherein the core network module includes a core network processor, the core network memory, and the subscriber database, and wherein the core network memory stores the subscriber application program and core network configuration settings.

5. The method of claim 4, wherein the core network configuration settings control routing tables, class of service, and resource allocation.

6. The method of claim 1, wherein the core network services also facilitate exchanging of SMS text messages between the wireless communication devices served by the portable wireless communication system.

7. The method of claim 1, wherein the core network services also facilitate one or more additional services of: mobile switching services, subscriber authentication services, media resource function services, and transcoder services, and wherein initializing components of the core network module further involves initializing the one or more additional services.

8. The method of claim 1, wherein the portable wireless communication system also includes a Wifi access point housed in the single enclosure, wherein initializing components of the radio base station further involves initializing the Wifi access point.

9. The method of claim 8, wherein the portable wireless communication system also includes a portable, Wifi-enabled satellite terminal configured for wireless communication with the Wifi access point, and wherein the portable, Wifi-enabled satellite terminal facilitates communication between the wireless communication devices served by the portable wireless communication system and other devices outside of the portable wireless communication system by way of the Wifi access point.

10. The method of claim 1, wherein the portable wireless communication system also includes a wireline port configured for communication with an external broadband wireless network, wherein the wireline port is one of an Ethernet port or a USB port, and wherein the external broadband wireless network facilitates communication between the wireless communication devices served by the portable wireless communication system and other devices outside of the portable wireless communication system.

11. The method of claim 1, wherein the base station configuration settings control system identification, operating frequency, transmit power, or modulation scheme.

12. The method of claim 1, wherein the control panel user interface is further configured to display respective states of one or more of the wireless communication devices served by the portable wireless communication system, wherein the states include idle, in-call, ringing, and off-hook.

13. The method of claim 1, wherein the control panel user interface facilitates: participation, by an operator of the control panel user interface, in the call, management, by the operator, of call volume of the call, disabling, by the operator, of wireless communication devices from making calls, or disconnection, by the operator, of the call.

14. A portable wireless communication system comprising:

a radio base station, wherein the radio base station includes a base station memory storing base station application programs and base station configuration settings;

a core network module integrated with the radio base station, both housed in a single enclosure, wherein the core network module includes a core network processor, a core network memory storing core network configuration settings, and a subscriber database; and a single switch connecting an electrical power supply to the portable wireless communication system, wherein activation of the single switch causes reception of electrical power by the portable wireless communication system and initialization of components of the radio base station and the core network module, wherein initializing components of the radio base station involves loading, by the base station application programs, the base station configuration settings from the base station memory, wherein initializing components of the core network module involves loading, by a subscriber application program, subscriber information from the subscriber database into the core network memory, and wherein the portable wireless communication system is configured to operate as a standalone cellular network by: (i) offering, by the core network module to the radio base station, core network services that facilitates placement and reception of calls by wireless communication devices served by the portable wireless communication system, and (ii) accepting, by the radio base station, the offered core network services and establishing a connection between the radio base station and the core network module, and (iii) in response to establishing the connection between the radio base station and the core network module, stepping up, by the radio base station, transmit power of a transceiver until the transceiver is transmitting at full power, wherein the core network module includes a control panel user interface for initiating calls and entering SMS text messages, the control panel user interface including a first button and a second button and the control panel user interface is configured to: (i) cause a call between at least two of the wireless communication devices served by the portable wireless communication system to be initiated by actuation of the first button, and (ii) cause an entered SMS text message to be sent to at least one of the wireless communication devices served by the portable wireless communication system by actuation of the second button, and wherein deactivation of the single switch causes deactivation of components of the radio base station and the core network module, wherein deactivating components of the radio base station involves storing, by the base station application programs, current base station configuration settings to base station memory, and stepping down, by the radio base station, transmit power of the transceiver until the transceiver is off, and wherein deactivating components of the core network module involves storing, by the subscriber application program, current subscriber information and call information into the core network memory.

15. The portable wireless communication system of claim 14, further comprising:
a Wifi access point housed in the single enclosure, wherein the portable wireless communication system is further configured to, in response to receiving the electrical power caused by activation of the single switch, initialize the Wifi access point.

16. The portable wireless communication system of claim 15, further comprising:
a portable, Wifi-enabled satellite terminal configured to, when the portable wireless communication system is receiving electrical power, support wireless communication with the Wifi access point, wherein the portable, Wifi-enabled satellite terminal facilitates communication between the wireless communication devices served by the portable wireless communication system and other devices outside of the portable wireless communication system by way of the Wifi access point.

17. The portable wireless communication system of claim 14, further comprising:
a wireline port in communication with an external broadband wireless network, wherein the wireline port is one of an Ethernet port or a USB port, and wherein the external broadband wireless network facilitates communication between the wireless communication devices served by the portable wireless communication system and other devices outside of the portable wireless communication system.

* * * * *